(12) United States Patent
Kamihara et al.

(10) Patent No.: US 9,477,389 B2
(45) Date of Patent: Oct. 25, 2016

(54) PARAMETER CONTROLLING APPARATUS (75) Inventors: Masanori Kamihara, Hamamatsu (JP);
Toru Kitayama, Hamamatsu (JP)

(73) Assignee: Yamaha Corporation, Hamamatsu-shi (JP)

( * ) Notice: Subject to any disclaimer, the term of this patent is extended or adjusted under 35 U.S.C. 154(b) by 535 days.

(21) Appl. No.: 13/531,996

(22) Filed: Jun. 25, 2012

(65) Prior Publication Data
US 2012/0328130 A1 Dec. 27, 2012

(30) Foreign Application Priority Data

Jun. 24, 2011 (JP) .................................. 2011-141265

(51) Int. Cl.
*G06F 3/0484* (2013.01)
*G06F 3/0488* (2013.01)

(52) U.S. Cl.
CPC ......... *G06F 3/04847* (2013.01); *G06F 3/0488* (2013.01)

(58) Field of Classification Search
CPC ............. G06F 3/04847; G06F 3/0488; G06F 3/04886; G06F 2203/04808; G06F 3/017
USPC ...... 345/156, 173; 381/119; 700/94; 84/645; 369/4; 715/716
See application file for complete search history.

(56) References Cited

U.S. PATENT DOCUMENTS

| | | | |
|---|---|---|---|
| 5,559,301 A * | 9/1996 | Bryan et al. | .................... 84/653 |
| 5,954,829 A | 9/1999 | McLain, Jr. et al. | |
| 2003/0016248 A1 | 1/2003 | Hayes Ubillos | |
| 2005/0231512 A1 * | 10/2005 | Niles et al. | .................... 345/473 |
| 2006/0022956 A1 * | 2/2006 | Lengeling et al. | ........... 345/173 |
| 2006/0210098 A1 * | 9/2006 | Okabayashi et al. | ......... 381/119 |
| 2006/0232586 A1 * | 10/2006 | Terada | .......................... 345/440 |
| 2008/0094367 A1 * | 4/2008 | Van De Ven et al. | ........ 345/173 |

FOREIGN PATENT DOCUMENTS

| | | |
|---|---|---|
| EP | 2 071 433 A2 | 6/2009 |
| EP | 2 071 433 A3 | 6/2009 |
| JP | 61-15198 A | 1/1986 |
| JP | 2010-233005 A | 10/2010 |

OTHER PUBLICATIONS

European Search Report dated Jul. 28, 2015 (10 pages).

* cited by examiner

*Primary Examiner* — Koosha Sharifi-Tafreshi
(74) *Attorney, Agent, or Firm* — Crowell & Moring LLP (57) ABSTRACT

A parameter controlling apparatus has a CPU 201 and operation input portion 302, 303 and 305 which include an operating area 303 whose operated position can be detected, and accept input operation. The CPU 201 detects whether the operation input portion is operated in the first manner or the second manner in accordance with the accepted input operation, and detects the content of the input operation of the operating area 303. In a case where the first manner has been detected, the CPU 201 also changes a value of a target parameter in accordance with the content of the input operation of the operating area 303. In a case where the second manner has been detected, the CPU 201 also switches a type of a target parameter in accordance with the content of the input operation of the operating area 303.

10 Claims, 3 Drawing Sheets

PARAMETER CONTROLLING APPARATUS

BACKGROUND OF THE INVENTION

1. Field of the Invention

The present invention relates to a parameter controlling apparatus for changing a value of a parameter assigned to an operating element as a target which is to be controlled by use of the operating element, and more particularly to an art for switching a target parameter which is to be assigned to the operating element.

2. Description of the Related Art

Conventionally, there is a touch type (slider type) operating element which allows a user to change the value of a target parameter with the touch of the operating element. The touch type operating element is widely used as a means of assigning one of various kinds of parameters as a target parameter such as a parameter for setting a level of acoustical signal, and changing a value of the assigned parameter. Various kinds of music apparatuses have quite a large number of types of parameters which are to be specified. In some cases, however, due to limitation of space of a panel, the number of operating elements provided on the panel of an apparatus has to be a certain number or less. In order to resolve the problem, therefore, many apparatuses employ a scheme in which an operating element is assigned a target parameter but is allowed to switch the assigned parameter to a different parameter by user's certain operation. For example, Japanese Unexamined Patent Publication No. 61-15198 discloses an art for changing a target parameter assigned to a touch bar by use of a key which is different from the touch bar.

As an art for switching parameter assigned to an operating element, there is an art disclosed in Japanese Unexamined Patent Publication No. 2010-233005. More specifically, this publication discloses the art applied to an electronic music apparatus having a display unit and an assignable operating element on a panel, the art switching a target parameter associated with the assignable operating element in synchronization with switching of display screen.

SUMMARY OF THE INVENTION

In order to switch a parameter assigned to a touch type operating element, schemes employed in the above-described Japanese Unexamined Patent Publication No. 61-15198 and Japanese Unexamined Patent Publication No. 2010-233005 require a plurality of operating elements for instructing the switching and a display in addition to the touch type operating element, resulting in a complicated configuration and user-unfriendliness.

The present invention was accomplished to realize the switching of target parameter by a simple configuration and easy operability. As for descriptions for respective constituents of the present invention described below, numbers corresponding to components of a later-described embodiment are given in parenthesis for easy understanding. However, the respective constituents of the present invention are not limited to the corresponding components indicated by the numbers of the embodiment.

In order to achieve the above-described object, it is a feature of the present invention to provide a parameter controlling apparatus including an operation input portion (302, 303, 305) which includes an operating area (303) whose operated position can be detected, and accepts an input operation; a detection portion (501) for detecting whether the operation input portion is operated in a first manner for changing a value of a target parameter or in a second manner for switching a type of target parameter in accordance with the accepted input operation, and also detecting content of the input operation of the operating area; a parameter value change portion (507) for changing the value of the target parameter which is to be controlled by the operating area in accordance with the content of the input operation of the operating area when the detected manner is the first manner; and a parameter type switching portion (509, 510) for switching the type of the target parameter which is to be controlled by the operating area in accordance with the content of the input operation of the operating area when the detected manner is the second manner.

In this case, for example, the content of the input operation of the operating area is information which relates to sliding operation of the operating area and represents a direction in which a finger has moved and a distance for which the finger has moved; and the parameter value change portion increases or decreases the value of the target parameter in accordance with the information relating to the sliding operation. Furthermore, the operating area includes a display device (401) for displaying a position corresponding to a current value of the parameter; the content of the input operation of the operating area is information which relates to depressing operation of the operating area and represents a position at which the operating area has been depressed and released with a finger; and the parameter value change portion increases or decreases the value of the target parameter in accordance with a relation between the position represented by the information relating to the depressing operation and the position displayed by the display device.

Furthermore, the operating area has a plurality of sectional areas (304) corresponding to a plurality of parameter types, respectively; the content of the input operation of the operating area is information which relates to depressing operation of the operating area and represents a position at which the operating area has been depressed and released with a finger; and the parameter type switching portion switches the types of the target parameter which is to be controlled by the operating area to a type of a parameter corresponding to a sectional area in which the position represented by the information relating to depressing operation is situated.

Furthermore, for example, the operation input portion also has a first switch (305) in addition to the operating area; and the detection portion detects either the first manner or the second manner depending on whether the operating area and the first switch of the operation input portion have been operated concurrently or not. In this case, the operating area includes a display device for displaying the currently assigned parameter type when the first switch is operated. Furthermore, the detection portion detects either the first manner or the second manner depending on whether or not the depressing operation has been performed on the Operating area for a plurality of times within a certain period of time. Furthermore, the detection portion detects either the first manner or the second manner depending on whether or not the depressing operation has been performed on the operating area for a certain period of time or more.

It is another feature of the present invention that the detection portion detects whether the operation input portion is operated in the first manner, the second manner or a third manner in which a value of a target parameter is changed in a resolution which is finer than a resolution of the first manner; and the parameter value change portion changes the value of the target parameter which is to be controlled by the operating area in a certain resolution in accordance with the content of the Input operation of the operating area when the detected manner is the first manner, and changes the value of the target parameter which is to be controlled by the operating area in a resolution which is finer than the certain resolution in accordance with the content of the input operation of the operating area when the detected manner is the third manner.

In this case, for example, the operation input portion also has a second switch (302) in addition to the operating area; and the detection portion detects either the first manner or the third manner depending on whether the operating area and the second switch of the operation input portion have been operated concurrently or not.

Without a plurality of operating elements and an additional display for instructing the switching of a target parameter, the present invention achieves the switching of target parameter by the simple configuration and realizes the easy operability.

In addition, the present invention is not limited to the invention of the parameter controlling apparatus, but can be embodied as a method for controlling a parameter and as a computer program for parameter control.

DESCRIPTION OF THE PREFERRED EMBODIMENT

Figure 1:
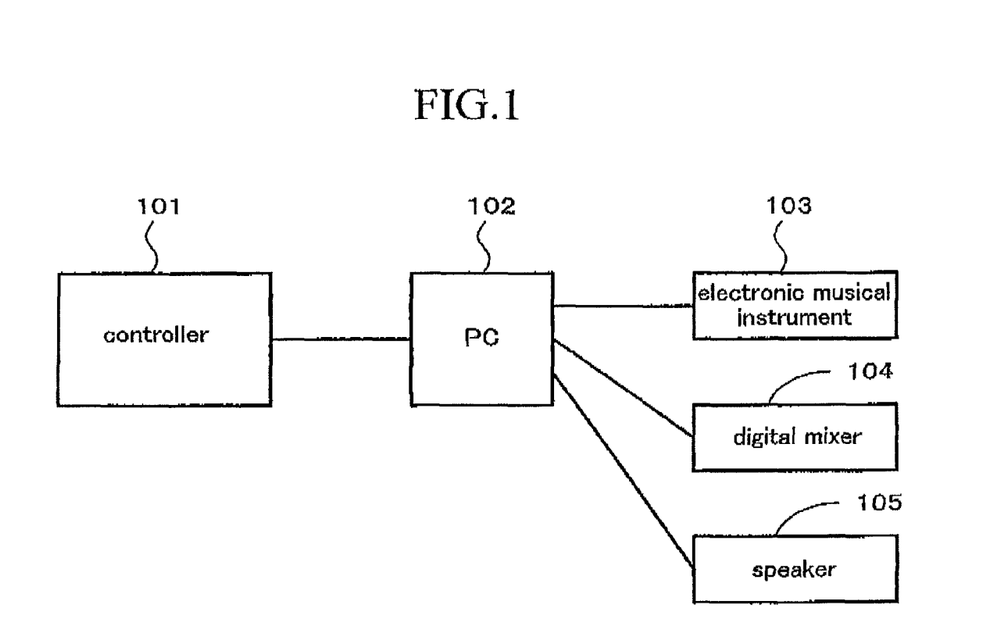
FIG. 1 is a diagram indicative of an example configuration of a system to which a controller of an embodiment is applied.

An embodiment of the present invention will now be described with reference to the drawings. FIG. 1 indicates an example system to which a controller 101 which is an embodiment of the present invention is applied.

A PC 102 is a general-purpose personal computer; on which integrated music software referred to as a DAW (digital audio workstation) operates. To the PC 102, a general-purpose keyboard and a general-purpose mouse can be connected in order to manipulate the DAW with the keyboard and mouse. By executing the DAW, the PC 102 serves as a music apparatus which realizes various kinds of capabilities for creating music (for example, hard disk recording capability, capability of creating/editing MIDI data and audio data, mixing capability, sequencing capability, etc.).

To the PC 102, an electronic musical instrument 103, a digital mixer 104, and a speaker 105 are connected. For instance, audio signals output from the electronic musical instrument 103 or the digital mixer 104 can be recorded by the DAW of the PC 102, whereas audio signals output from the PC 102 can be input to the electronic musical instrument 103 and the digital mixer 104, In addition, audio signals output from the PC 102 can be emitted from the speaker 105. The controller 101, which is a device for allowing a user to easily operate the DAW executed on the PC 102 at hand, is a device designed specifically for the DAW. The constituents (respective devices) 101 to 105 shown in FIG. 1 are separate and independent devices, and are externally connected (externally added) with each other.

Figure 2:
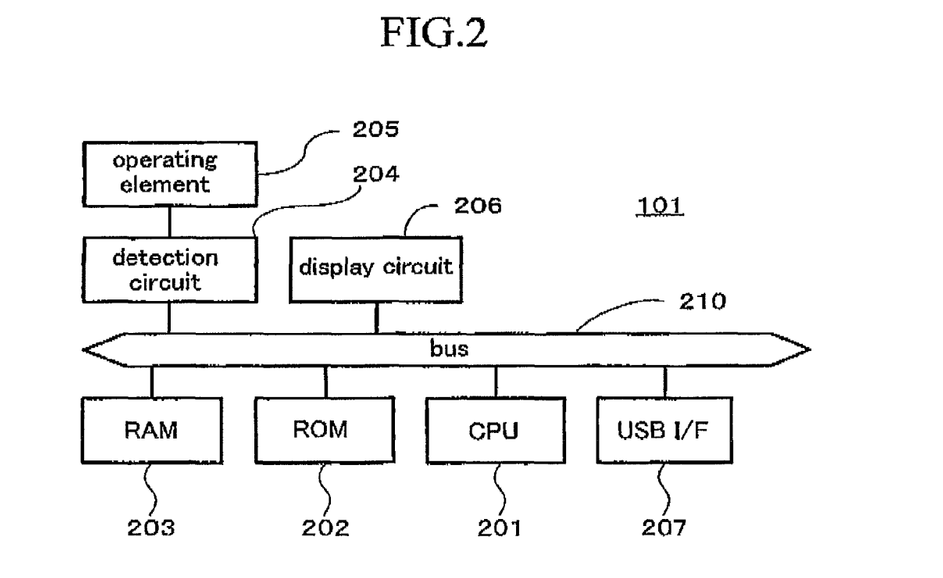
FIG. 2 is a diagram indicative of a hardware configuration of the controller.

FIG. 2 indicates a hardware configuration of the controller 101. The controller 101 has a central processing unit (CPU) 201, a ROM (read-only memory) 202, a RAM (random-access memory) 203, a detection circuit 204, an operating element 205, a display circuit 206, and a USB interface (I/F) 207. A bus line 210 is a bus line for connecting these elements with each other, and is a generic name for a control bus, a data bus and an address bus.

The CPU 201 is a processing unit which controls the entire operation of the controller 101. The ROM 202 is a nonvolatile memory which stores control programs which are to be executed by the CPU 201 and various kinds of data. The RAM 203 is a volatile memory used as a loading area and a working area for programs executed by the CPU 101. The operating element 205 includes buttons (switches) and a touch type operating element provided on an external panel of the controller 101. The detection circuit 204 detects user's operation of the operating element 205, and transmits information indicative of the user's operation to the CPU 201. The display circuit 206 is a circuit for turning on/off respective LEDs provided on the operating element 205. The USB I/F 207 is a USB (universal serial bus) interface for connecting the controller 101 to the PC 102.

Figure 3:
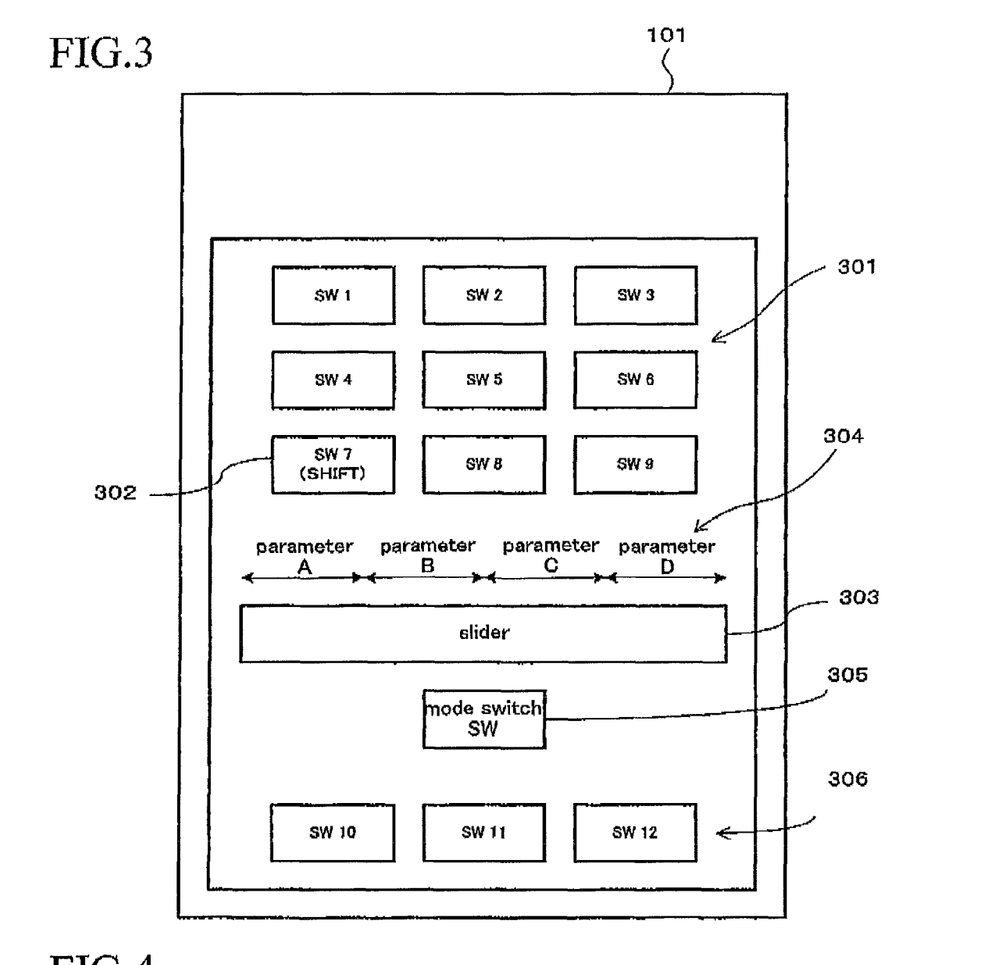
FIG. 3 is an external view of a panel of the controller.

FIG. 3 is an external view of the panel of the controller 101. The controller 101 is sized, for example, such that the user can hold the entire controller 101 with the user's left hand to operate the controller 101 with the user's right hand. SWs 1 to 9 indicated by a numeric character 301, SWs 10 to 12 indicated by a numeric character 306 and a mode switch SW 305 are equivalent to buttons included in the operating element 205. Each of the buttons 301, 305, 306 is a hardware switch for turning on/off a function or a parameter assigned to the button by user's operation of depressing the button with a user's finger or the like and then releasing the button without displacing the finger (hereafter referred to as the "depressing operation"). Each of the buttons 301, 306, 306 has an LED for indicating its on/off state.

A button 302 (SW 7) is used as a shift switch which will be explained later. An operating element indicated by a numeric character 303 is equivalent to a touch type operating element (hereafter simply referred to as a "slider", for it is used similarly to a hardware slider type operating element) included in the operating element 205. The slider 303 is a hardware operating element for changing (increasing/decreasing) a value of an assigned parameter by user's operation of depressing the slider 303 with a user's finger or the like, moving the finger to the right or left and than releasing the finger from the slider 303 (hereafter, the operation is referred to as the "sliding operation"), or by user's operation of depressing the slider at a user's desired position in the longitudinal direction of the slider. Additionally, movable range in which a finger is allowed to move is limited to a rectangular region of the slider 303. Within the movable range, the slider 303 is provided with a plurality of LEDs. The term, "depressing" used in the "sliding operation" and the "depressing operation" includes user's operation of touching lightly on the slider 303 with a finger or the like.

Figure 4:
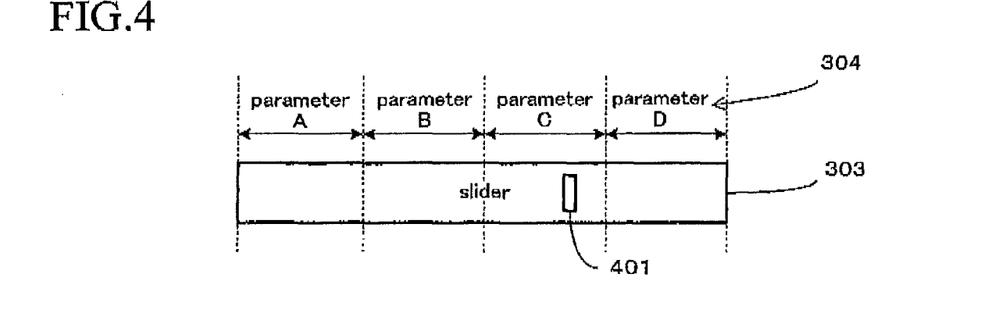
FIG. 4 is an enlarged view of a slider.

FIG. 4 is an enlarged view of the slider 303. The rectangle of the slider 303 indicated in FIGS. 3 and 4 is a region in which the user can perform the sliding operation or the depressing operation with a user's finger (the region in which the user's operation is accepted). A numeric character 304 indicates four sectional areas obtained by dividing a range in which the user is allowed to move the user's finger on the slider 303 into four sections. The four sections are used in order to switch a target parameter which the slider 303 is to control. The switching among the parameters will be explained later. A numeric character 401 shown in FIG. 4 is an LED provided on the slider 303. Although FIG. 4 indicates the LED 401 which is in an illuminated state, similar LEDs are arranged in the range in which the user is allowed to move the user's finger on the slider 303 (on the rectangle indicative of the slider 303 shown in the figure). The current value of an assigned parameter is represented by the position of an illuminated LED.

To the slider 303, a target parameter which is to be controlled by the slider 303 is assigned at all times. In this specification, the "target parameter" indicates a parameter whose value is to be controlled in accordance with user's operation of the slider 303, that is, in accordance with user's operation performed in an operating area which is a constituent of the present invention. In other words, a parameter currently assigned as a parameter which is to be controlled by the slider 303 is the "target parameter". The "operating area", which is an area in which user's operation can be accepted, corresponds to the rectangle 303 indicative of the slider in FIGS. 3 and 4 in this embodiment. In the operating area, user's operation is accepted in a plurality of manners.

By the controller 101, various kinds of instructions are given to the DAW executed on the PC 102. The controller 101 and the PC 102 are connected with each other by a USB interface. When a user's operation of the operating element 205 is detected on the controller 101, an ID for identifying the operated operating element and data indicative of content of the operation are transmitted to the DAW executed on the PC 102. In a storage device of the PC 102 such as a main memory or a hard disk, various kinds of parameter areas used in order to allow the DAW to perform various functions for creating music are provided. In the respective parameter areas, parameter values are stored. Furthermore, assignment information indicative of the assignment of parameters to the operating elements of the controller 101 is stored in the storage device of the PC 102 such as the main memory or the hard disk.

When the DAW operating on the PC 102 receives the ID for identifying an operating element and the data indicative of the content of the operation of the operating element from the controller 101, the DAW refers to the assignment information, identifies the parameter assigned to the operating element identified on the basis of the ID, and rewrites the value of the parameter stored in the storage device in accordance with the received data indicative of the content of the operation of the operating element. In a case where it is necessary to change the illumination of the LED of the operated operating element in accordance with the rewritten parameter value, data for changing the illumination of the LED is transmitted from the PC 102 to the controller 101 so that the controller 101 will control the Illumination/extinction of the LED of the operating element in accordance with the data. Parameters of the DAW which can be controlled by the operating elements of the controller 101 are all the parameters relating to the DAW such as parameters for controlling signal processing (values of tone volume levels, value of pan, etc.), parameters for controlling functions (fast forward speed, fast reverse speed, etc.), parameters relating to GUI (graphical user interface) and parameters for controlling GUI (the amount of operation of scroll bars displayed on a window, etc.).

The slider 303 indicated in FIG. 3 and FIG. 4 has a plurality of manners in which the slider 303 is operated.

The first operating manner is an operating manner for changing the value of a target parameter assigned to the slider at the point in time when this operation occurs (at the point in time when a later-described process shown in FIG. 5 starts). The first operating manner is a manner in which the sliding operation alone is performed on the slider 303 without operating any operating elements other than the slider 303. The expression, "without operating any operating elements other than the slider 303" indicates that the slider 303 is operated on condition that the mode switch SW 305 and the shift SW 302 are not being depressed. As for the SWs other than the mode switch SW 305 and the shift SW 302, even if a switch other than the mode switch SW 305 and the shift SW 302 is depressed concurrently with the operation of the slider 303, the concurrent operation of the switch and the slider 303 will not cause any problem as long as a function controlled by the switch and a function controlled by the slider 303 are not related. Normally (in a state where neither the mode switch SW 305 nor the shift SW 302 are being depressed), one of the LEDs of the slider 303 is illuminated to indicate the current value of an assigned parameter to allow the user to recognize the current value of the parameter. In this state, if the user performs the sliding operation of the first operating manner at a user's desired position of the slider 303, the value of the target parameter increases/decreases by an amount corresponding to the distance of the rightward/leftward move of the user's finger. Whether the parameter value increases or decreases is determined by the direction in which the finger moves.

The operation of the first operating manner can be also performed by the depressing operation. For example, by performing the depressing operation in an area which is situated in the right or left of the illuminated LED 401 of FIG. 4 and whose LED is not being illuminated in a state where the mode switch SW 305 is not being depressed, the target parameter value can increase/decrease by a certain amount (the amount can be previously determined) depending on whether the depressed area is situated in the right or left of the illuminated LED. In a case where the depression is maintained for a certain period of time before the finger is released from the area, the increase/decrease of the parameter value by the certain amount may be repeated during the depression.

The second operating manner of the slider 303 is a manner in which the type of target parameter controlled by the slider 303 is switched. More specifically, the second operating manner is the operation of depressing one of the four sectional areas 304 of the slider 303 while depressing the mode switch SW 305 (by the depression of the mode switch SW 305, all the LEDs provided on the slider 303 are turned off). The target parameter can be selected by the user from among four types, that is, parameters A, B, C and D. In FIGS. 3, and 4, the respective sectional areas corresponding to the four parameter types are indicated by arrows (←→). In a case where the user desires to switch the current target parameter assigned to the slider 303 to "parameter C", for example, the user is to depress a desired position of a sectional area which is included in the slider 303 and indicates a parameter to which the user desires to switch, that is, a desired position of the sectional area falling within the arrows indicative of "parameter C" while depressing the mode switch SW 305. It may be designed such that the LED of the sectional area of the slider 303 corresponding to the currently assigned parameter type is illuminated during the depression of the mode switch SW 305 so that the user can recognize the currently assigned parameter type. For example, this illumination is always-on light or blinking light. In a case where the user performs the sliding operation of the slider 303 while depressing the mode switch SW 305, the parameter type may be switched by assuming that the depressing operation has been made at the position at which the finger which performed the sliding operation was released.

The scheme in which the sectional areas are divided and the assignments of the parameter types to the sectional areas are previously determined at the design phase. However, the scheme and the assignments may be specified by the user as the user desires. Furthermore, the sectional areas 304 of FIGS. 3 and 4 may be displayed or printed on the panel so that the user can visually recognize the division of the sectional areas and the assignments of the sectional areas to the parameter types.

The third operating manner of the slider 303 is a manner for changing a value of a parameter in a resolution finer than the first operating manner for changing a parameter value. More specifically, by performing the sliding operation of the slider 303 while depressing the shift SW 302 (in a state where the mode switch SW 305 is not being depressed), a parameter value can be changed in a finer resolution. Although both the first operating manner and the third operating manner of the slider 303 are manners for changing a value of a target parameter in accordance with the distance for which a user's finger operating the slider has moved, a parameter value is changed in a normal resolution by the first operating manner in which the shift SW 302 will not be depressed, whereas a parameter value is changed in a resolution finer than the normal resolution by the third operating manner in which the shift SW 302 is depressed. In a case, for example, where a certain coefficient (the coefficient is a value of the resolution) is multiplied by the distance for which the finger operating the slider has moved to determine the amount by which the parameter value is to be changed, it is preferable to have a great coefficient for the operating manner in which the shift SW 302 will not be depressed and to have a small coefficient for the operating manner in which the shift SW 302 is depressed.

The operation in the third operating manner can be also done by the depressing operation. By performing the depressing operation in an area which is situated on the right or left of the illuminated LED 401 of FIG. 4 and whose LED is not illuminated while depressing the shift SW 302 in a state where the mode switch SW 305 is not being depressed, for example, the value of the target parameter can be increased or decreased by a certain amount (the amount corresponding to the resolution is previously set at a value which is smaller than a certain amount set for the case where the first operating manner is done by the operation of depressing the slider 303) depending on whether the position where the user has performed the depressing operation is situated on the right or the left of the illuminated LED. In a case where the depression is maintained for a certain period of time or more before the finger is released from the slider, the increase or decrease in the parameter value by the certain amount may be repeated during the depression.

Figure 5:
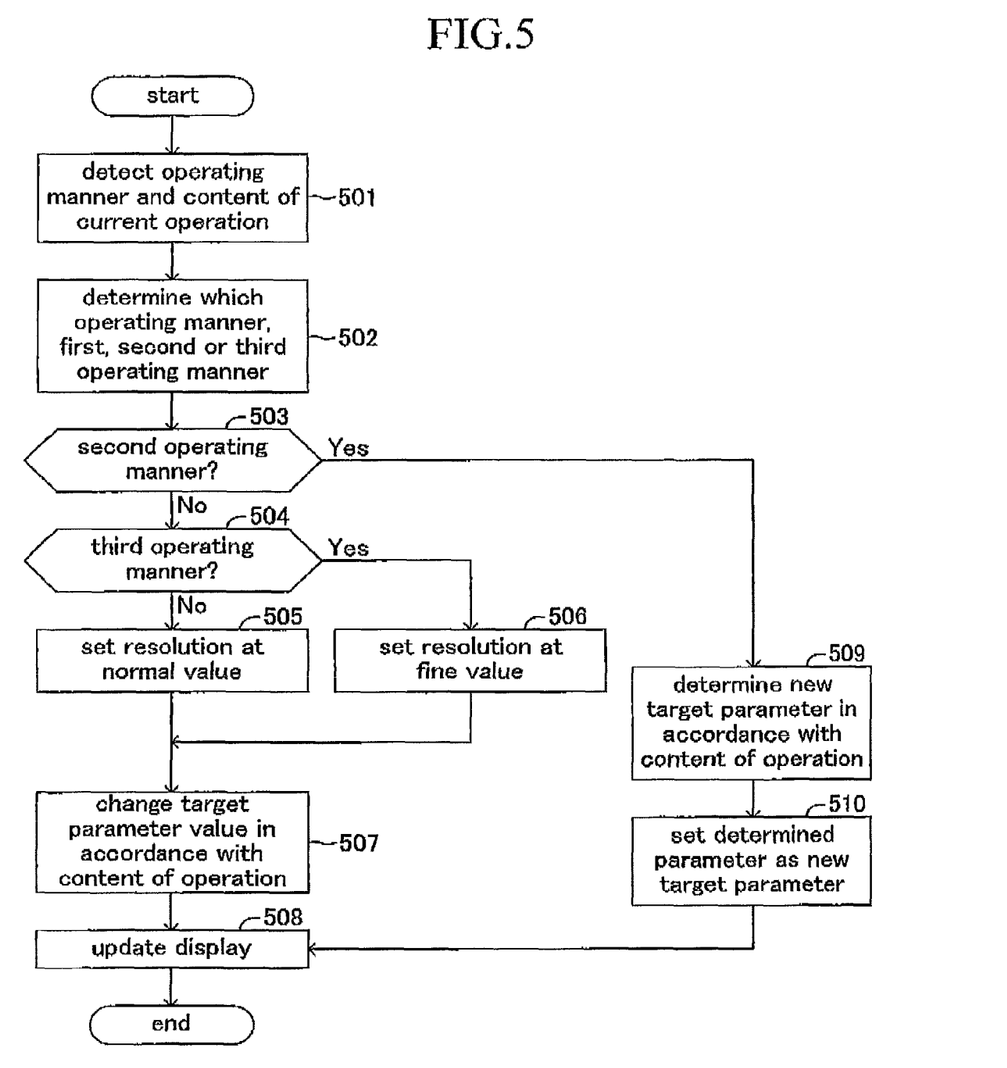
FIG. 5 is a flowchart of a slider operation process.

FIG. 5 is a flowchart indicative of a procedure of a slider operation process executed by the CPU 201. This process is executed when a users operation of the slider 303 finishes. As described above, there are the first to third operating manners in which the operation of the slider 303 including the operation of the shift SW 302 or the mode switch SW 305 is performed. In any of these manners, when a user's finger is released from the slider in the sliding operation or the depressing operation, the CPU 201 detects the release from the slider and executes the process.

First, the operating manner and the content of the current operation are detected in step 501. In a case where the detected operating manner is the first or third operating manner, the CPU 201 detects information indicative of whether the operation is the sliding operation or the depressing operation as the content of the operation. In a case where the sliding operation is detected, the CPU 201 further detects information indicative of the direction in which the finger has moved and the distance of the move. In a case where the depressing operation is detected, the CPU 201 further detects information indicative of the position where the slider has been depressed with the finger and released. In a case where the detected operating manner is the second operating manner, the CPU 201 detects information indicative of the position where the slider has been depressed with the finger and released as the content of the operation.

In step 502, the CPU 201 determines the detected operating manner. In the case of the first operating manner, the process proceeds to steps 503, 504, 505 in this order, to set the value of resolution at a normal value in step 505. In the case of the third operating manner, the process proceeds to steps 503, 504, 506 in this order, to set the value of resolution at a value finer than the normal value in step 606. In the case of the second operating manner, the process proceeds from 503 to 509.

After steps 505 and 506, the value of a parameter currently set as a target parameter is changed in step 507 in accordance with the detected content of the operation. In the case where the operation of the first or third manner is a sliding operation, step 507 is a process for increasing/decreasing the value of the target parameter in accordance with the direction in which the finger has moved and the distance of the move detected in step 501 by use of the resolution value set in step 505 or 506. In the case where the operation of the first or third manner is a depressing operation, step 507 is a process for increasing/decreasing the value of the target parameter in accordance with the position where the slider has been depressed and released with the finger detected in step 501, by use of the resolution value set in step 505 or 506. In step 508, the illumination state of the LEDs provided on the slider 303 is changed in accordance with the updated parameter value.

In the case of the second operating manner, the type of a parameter which is to be set as a new target parameter is determined in step 509 in accordance with the content of the operation detected in step 501, whereas the determined parameter type is set as a new target parameter in step 510. More specifically, step 509 is a process for determining the parameter type depending on which sectional area of the four sectional areas 304 indicated in FIGS. 3 and 4 includes the position at which the slider has been depressed and released with the finger. In a case where the slider has been depressed and released with the finger in the sectional area of parameter A, for example, the parameter A is to be set as a target parameter. In a case where the slider has been depressed and released with the finger in the sectional area of parameter B, for example, the parameter B is to be set as a target parameter. Then, the process proceeds to step 508 to change the illumination state of the LEDs provided on the slider 303 in accordance with the value of the parameter set as the new target parameter.

Although the flow of FIG. 5 is explained as a process executed by the CPU 201, the DAW operating on the PC 102 actually controls various parameters. Therefore, the process shown in FIG. 5 is actually executed by the CPU 201 of the controller 101 in cooperation with a CPU which executes the DAW on the PC 102. From a broad viewpoint that the CPU 201 of the controller 101 provides instructions to the DAW of the PC 102 so that the DAW can control parameters, the process of FIG. 5 is explained as the process executed by the CPU 201 of the controller 101. In this case, the share of the workload between the CPU 201 of the controller 101 and the CPU of the PC 102 can be designed as desired.

In this embodiment, in actuality, information indicative of the user's operation detected by the controller 101 is transmitted directly to the PC 102 to allow the DAW of the PC 102 to execute the process of FIG. 5. In this case, the controller 101 is not required to have various kinds of data (e.g., the type of parameter currently set to the slider 303 as a target parameter, the current value of the parameter, etc.) for the control of FIG. 5 as long as the PC 102 has the data. In step 508, furthermore, the change in display of the LEDs can be done by the controller 101 by receiving instructions from the DAW of the PC 102. In order to promptly achieve the change in display of LEDs, however, the controller 101 may have data relating to display of the LEDs.

This embodiment may be modified such that the CPU 201 of the controller 101 carries out all the steps except steps 507 and 510 while a command to change a parameter value is transmitted from the controller 101 to the DAW of the PC 102 to perform the change in the parameter value in step 507, and a command to switch the current parameter type to a determined parameter type is transmitted from the controller 101 to the DAW of the PC 102 to perform the change in parameter type in step 510. In this modification, the controller 101 is also required to have the various kinds of data for the control of FIG. 5.

A target parameter which is to be assigned to the slider 303 may not necessarily be a parameter whose value continuously varies but may be a parameter whose value is discrete.

Although the slider 303 of this embodiment is operated by the user by moving the slider with a user's finger in the lateral direction, the slider of the embodiment may be a slider operated by the user by moving the slider with a user's finger in the vertical direction. In addition, the hardware configuration which realizes the slider 303 can be any configuration. For instance, a plurality of on/off switches may be arranged in the area where the slider 303 is depressed by the user with a user's finger so that the on/off switches will detect the depressing operation, the move of the finger, and the release of the finger from the slider.

Furthermore, although the above-described embodiment is designed to configure the slider 303 by a single hardware operating element, a part of a touchscreen display may serve as an operating area. For example, on an entire touchscreen display provided on a PC (personal computer), a smartphone or the like, objects indicative of operating elements may be displayed so that a user will touch on the displayed objects to change a parameter value.

Although the above-described embodiment is an example in which the present invention is applied to the system to which the PC 102 and the controller 101 are connected, the present invention may be configured by arranging the slider and the switches indicated in FIG. 3 on a panel of an apparatus such as a digital mixer. In this case, the present invention may be applied by arranging a slider and switches which are hardware operating elements on the panel, or by displaying objects corresponding to a slider and switches on a touchscreen display provided on the panel so that a user can touch the displayed objects to change a parameter value. The present invention may be also applied to a general-purpose PC having a touchscreen display on which objects corresponding to the slider and switches are displayed. Furthermore, the present invention may be applied to a general-purpose controller which has a touchscreen display and is connected to a PC or a digital mixer to remote-control the PC or the digital mixer.

Although the second operating manner of the above-described embodiment is defined as the operation of depressing a sectional area of the slider 303 while depressing the mode switch SW 305, the embodiment may be modified such that the parameter type will be switched by depressing any one of the four sectional areas of the slider 303 for a plurality of times within a certain period of time (such as an operation similar to a double-click on a mouse), or by keeping depressing any one of the sectional areas of the slider 303 for a certain period of time or more.

The above-described embodiment defines the first operating manner as operating the slider 303 without depressing the mode switch SW 305 nor the shift SW 302, the second operating manner as operating the slider 303 in a state where the mode switch SW 305 is being depressed, and the third operating manner as operating the slider 303 in a state where the shift SW 302 is being depressed. These manners are defined as the embodiment of a preferable practical example configuration to which consideration of user convenience is given. More specifically, the operation (the first operating manner, i.e., control of a parameter value in the normal resolution) frequently performed by a user is realized by the operation which is the easiest, handiest, commonest manner, while the operation (for example, the second operating manner, i.e., change in the type of target parameter) temporarily, occasionally performed by a user is realized by the operation which is somewhat distinctive and inconvenient compared with the first operating manner.

However, various operating manners can be used as long as there are at least three different operating manners as manners for operating a single operating area. Therefore, three different operating manners can be appropriately selected as the first to third operating manners from among various different operating manners such as (1) operating the slider 303 without depressing any switch, (2) operating the slider 303 while depressing a certain switch SW, (3) operating the slider 303 while depressing a shift SW, (4) depressing a certain position of the slider 303 for a plurality of times within a certain period of time, and (5) keeping depressing a certain position of the slider 303 for a certain period of time or more.

The content of operation of the above-described embodiment may be any information as long as the information indicates the amount of change in parameter value or a new value of a parameter. In addition to the amount of move of a finger and the operated position, the content of the operation may be indicated by operated pressure or the time during which the slider is operated. Instead of the control of a parameter value by the sliding operation of the slider 303 (the first operating manner), the value of a target parameter may be controlled in accordance with the pressure applied by a user depressing a certain position of the slider 303 with a user's finger, or in accordance with the time during which a user keeps depressing a certain position of the slider 303 with a finger. The second and third operating manners may be similarly modified. For example, the type of parameter may be switched in accordance with the pressure applied by a user's finger depressing a certain position of the slider 303 while depressing the mode switch SW.

Although the slider 303 of the above-described embodiment has four sectional areas, the number of sectional areas may be any number. Furthermore, the area used as the sectional areas of the slider 303 is not necessarily the whole area of the slider (the operating area), but may be a part of the operating area. That is, the slider 303 can have any configuration as long as a user can instruct to change the type of target parameter assigned to the operating area by use of the operating area (the whole area or a part of the operating area) for changing a parameter value.

Because the above-described embodiment allows, by user's operation of the touch type operating element in the second operating manner, switching among target parameters to select a target parameter which is to be assigned to the touch type operating element, the above-described embodiment can be realized even by an apparatus having no display unit for displaying a selection screen and the like, that is, even by a quite simple compact configuration for switching among target parameters. In addition to the touch type operating element, for instance, what is required for the above-described embodiment to have is a switch. Furthermore, because the type of target parameter assigned to the operating element is switched by use of the operating element itself which is used for controlling a parameter value, the operation for switching target parameter is easy and user-friendly so that the user can perform the switching of parameter type and the control of parameter value seamlessly, quickly and smoothly. As for the manner in which the type of parameter is switched by keeping depressing a certain sectional area of the touch type operating element for a certain period of time or more, or by touching the sectional area for a plurality of times within a certain period of time, the switching of the type of parameter assigned to the touch type operating element can be achieved only by the operation of the touch type operating element itself in the second manner, which realizes a simple configuration. Such a simple configuration enables cost reduction. In addition, the simple configuration has a small number of components which a user operates, resulting in simple, quick, accurate operability. By the simple operation of performing the normal operation while depressing a shift switch, furthermore, the above-described embodiment allows a user to fine-adjust a parameter value.

What is claimed is:

1. A parameter controlling apparatus comprising:
    an operation input portion which includes an operating area whose operated position can be detected, and which accepts an input operation, the operating area having a plurality of sectional areas corresponding to a plurality of parameter types;
    a processor that detects whether the operation input portion is operated in a first manner that changes a value of a type of target parameter or in a second manner that switches a type of target parameter in accordance with the accepted input operation, the processor also detecting content of the input operation of the operating area; and
    a slider that changes the value of the type of target parameter which is switched in the second manner in accordance with the content of the input operation of the operating area when the detected manner is the first manner, wherein
        the processor switches a present type of target parameter to a new type of target parameter corresponding to a sectional area of the operating area in accordance with the content of the input operation of the operating area when the detected manner is the second manner;
        the content of the input operation of the operating area is information which relates to depressing operation of the operating area and represents a position at which the operating area has been depressed and released with a finger;
        the operation input portion also has a second switch in addition to the operating area; and
        the processor detects either the first manner or a third manner, in which a value of a target parameter is changed in a resolution which is finer than a resolution of the first manner, depending on whether the operating area and the second switch of the operation input portion have been operated concurrently or not.

2. The parameter controlling apparatus according to claim 1, wherein
    the content of the input operation of the operating area is information which relates to sliding operation of the operating area and represents a direction in which a finger has moved and a distance for which the finger has moved; and
    the slider increases or decreases the value of the target parameter in accordance with the information relating to the sliding operation.

3. The parameter controlling apparatus according to claim 1, wherein
    the operating area includes a display device configured to display a position corresponding to a current value of the parameter;
    the content of the input operation of the operating area is information which relates to depressing operation of the operating area and represents a position at which the operating area has been depressed and released with a finger; and
    the slider increases or decreases the value of the target parameter in accordance with a relation between the position represented by the information relating to the depressing operation and the position displayed by the display device.

4. The parameter controlling apparatus according to claim 1, wherein
    the operation input portion also has a first switch in addition to the operating area; and
    the processor detects either the first manner or the second manner depending on whether the operating area and the first switch of the operation input portion have been operated concurrently or not.

5. The parameter controlling apparatus according to claim 4, wherein
    the operating area includes a display device configured to display the currently assigned parameter type when the first switch is operated.

6. The parameter controlling apparatus according to claim 1, wherein
    the processor detects either the first manner or the second manner depending on whether or not the depressing operation has been performed on the operating area for a plurality of times within a certain period of time.

7. The parameter controlling apparatus according to claim 1, wherein
    the processor detects either the first manner or the second manner depending on whether or not the depressing operation has been performed on the operating area for a certain period of time or more.

8. The parameter controlling apparatus according to claim 1, wherein
    the slider changes the value of the target parameter which is to be controlled by the operating area in a certain resolution in accordance with the content of the input operation of the operating area when the detected manner is the first manner, and changes the value of the target parameter which is to be controlled by the operating area in a resolution which is finer than the certain resolution in accordance with the content of the input operation of the operating area when the detected manner is the third manner.

9. A method for controlling a parameter, the method being applied to a parameter controlling apparatus having a processor, an operation input portion which includes an operating area whose operated position can be detected, and accepts an input operation, the operating area having a plurality of sectional areas corresponding to a plurality of parameter types, the method comprising the steps of:

detecting whether the operation input portion is operated in a first manner that changes a value of a type of target parameter or in a second manner that switches a type of a target parameter in accordance with the input operation accepted by the operation input portion, and also detecting content of the input operation of the operating area;

changing the value of the type of target parameter which is switched in the second manner in accordance with the content of the input operation of the operating area when the detected manner is the first manner; and     switching a present type of target parameter to a new type of target parameter corresponding to a sectional area of the operating area in accordance with the content of the input operation of the operating area when the detected manner is the second manner, wherein         the content of the input operation of the operating area is information which relates to depressing operation of the operating area and represents a position at which the operating area has been depressed and released with a finger,         the operation input portion also has a second switch in addition to the operating area, and         the processor detects either the first manner or a third manner, in which a value of a target parameter is changed in a resolution which is finer than a resolution of the first manner, depending on whether the operating area and the second switch of the operation input portion have been operated concurrently or not.

10. A non-transitory computer-readable medium storing a computer program for parameter control executed by a processor, the computer program being applied to a parameter controlling apparatus having an operation input portion which includes an operating area whose operated position can be detected, and accepts an input operation, the operating area having a plurality of sectional areas corresponding to a plurality of parameter types, the computer program comprising the steps of:

detecting whether the operation input portion is operated in a first manner that changes a value of a type of target parameter or in a second manner that switches a type of a target parameter in accordance with the input operation accepted by the operation input portion;

detecting content of the input operation of the operating area;

changing the value of the type of target parameter which is switched in the second manner in accordance with the content of the input operation of the operating area when the detected manner is the first manner; and     switching a present type of target parameter to a new target parameter corresponding to a sectional area of the operating area in accordance with the content of the input operation of the operating area when the detected manner is the second manner, wherein         the content of the input operation of the operating area is information which relates to depressing operation of the operating area and represents a position at which the operating area has been depressed and released with a finger,         the operation input portion also has a second switch in addition to the operating area, and         the processor detects either the first manner or a third manner, in which a value of a target parameter is changed in a resolution which is finer than a resolution of the first manner, depending on whether the operating area and the second switch of the operation input portion have been operated concurrently or not.

\* \* \* \* \*